United States Patent [19]
Li et al.

[11] 3,804,489
[45] Apr. 16, 1974

[54] ELECTRO-OPTIC THIN-FILM DIFFRACTION LOSS MODULATOR

[75] Inventors: Tingye Li, Rumson; Robert Dean Standley, Shrewsbury, both of N.J.

[73] Assignee: Bell Telephone Laboratories, Incorporated, Berkeley Heights, N.J.

[22] Filed: Dec. 6, 1972

[21] Appl. No.: 312,682

[52] U.S. Cl. .................... 350/160 R, 350/96 WG
[51] Int. Cl. .............................................. G02f 1/26
[58] Field of Search ..................... 350/160, 96 WG

[56] References Cited
UNITED STATES PATENTS

| | | | |
|---|---|---|---|
| 3,633,995 | 1/1972 | Lean et al. | 350/161 |
| 3,633,996 | 1/1972 | Lean et al. | 350/161 |
| 3,655,261 | 4/1972 | Chang | 350/96 WG |
| 3,736,045 | 5/1973 | Heidrich | 350/96 WG |

*Primary Examiner*—William L. Sikes
*Attorney, Agent, or Firm*—W. L. Wisner

[57] ABSTRACT

An optical switch useful in thin-film electro-optic light guides relies on an induced stationary diffraction grating. The grating is produced by an interdigital electrode structure which is deposited on the electro-optic guide. The application of a voltage to the electrode pattern produces a spatial modulation of the refractive index of the guide which acts as a diffraction grating to light traveling in the guide. This grating causes light in the guide to be diffracted out of the guide, thereby stopping transmission. Removal of the voltage eliminates the grating and restores transmission.

9 Claims, 2 Drawing Figures

ELECTRO-OPTIC THIN-FILM DIFFRACTION LOSS MODULATOR

BACKGROUND OF THE INVENTION

This invention relates to modulators for light guides and, more particularly, to electro-optic modulators for thin-film light guides.

With the increase in activity in the field of optical communications in recent years, there has been a great deal of work done on the problems of modulating light traveling in thin-film light guides. An ideal modulator for this type of communications system would be simple to operate and construct, small in size, require a small amount of power, and have a good ON-OFF or extinction ratio. One type of modulator which meets some of these criteria is the "loss modulator." Loss modulators can operate by causing a localized surface disturbance in the cladding of a fiber-optic guide or the surface of a thin-film light guide. This has the effect of coupling propagating modes to radiating modes, thereby allowing the light to escape, ending transmission. One way of accomplishing this effect with a thin-film guide is to establish a traveling electric or acoustic wave on the surface of the guide with an interdigital electrode or transducer. This traveling wave produces a traveling group of changes in the index of refraction of the guide which are somewhat like a diffraction grating. As this traveling wave moves along the guide, the light traveling in the guide will be diffracted out of it and transmission of light in the guide will be halted.

The principal disadvantage of the traveling-wave diffraction-grating modulator is that it requires a voltage source with a high power and frequency output in order to drive the electrodes or transducers sufficiently to create a traveling wave which is large enough in amplitude and high enough in frequency to affect the light in the guide. Also, for efficient interaction with the optical signal, the traveling wave must extend over many optical wavelengths, making the physical length of the modulator large.

Another type of modulator uses interdigital electrodes on the top and bottom of an electro-optic crystal to create a diffraction grating extending across the path of a light beam propagating in the crystal. An example of this type of modulator is disclosed in an article entitled "Laser-Beam Modulation Using Grating Diffraction Effects," by J. F. St. Ledger and E. A. Ash, which appeared in the Mar. 22, 1968 issue of *Electronics Letters*, Vol. 4, No. 6, at page 99. With this type of modulator, the light beam is diffracted in the plane of the guide and modulation is accomplished because the beam is diverted away from a photo pick-up device. The trouble with this type of modulator is that it will work efficiently only if there is a well-collimated beam or a single mode of light propagating in the guide. When multiple modes are propagating, the deflection caused by the induced grating will cause one mode to miss the photo pick-up device, but may cause other modes to impinge directly on the device.

It is, therefore, an object of this invention to provide a switch which is small in size, easy to construct and requires only a dc voltage source, for modulating multi-mode light beams propagating in a thin-film light guide system.

SUMMARY OF THE INVENTION

The present invention is directed to the elimination of the need for a high power, high frequency, voltage source for a diffraction-type thin-film light guide loss modulator. This is accomplished by inducing a stationary diffraction grating along one side of the guide with a dc voltage source and an interdigital electrode structure.

In an illustrative embodiment of the invention, the modulator is formed from an interdigital electrode structure which is deposited on the surface of a thin-film electro-optic light guide. The electrode pattern is spaced so that the application of a dc voltage between its fingers results in a spatial modulation of the refractive index of the guide in the direction of light propagation. This acts as a diffraction grating which couples the light traveling in the guide into the medium above the guide when the proper grating spacing is selected. Therefore, when the voltage is applied, the light will be deflected out of the guide and transmission of light in the guide will be blocked. Removal of the voltage eliminates the grating and restores transmission. By filling the spaces between the fingers of the electrode pattern with a material having the same index of refraction as the electrode pattern, the pattern itself can be prevented from acting as a diffraction grating when no voltage is applied to it. This modulator will work on light beams having any polarization and, also, on light beams propagating with multiple modes. The only effect of multi-mode propagation is that the various modes are diffracted out of the guide at different angles. These same principles are also useful in the creation of similar structures such as, for example, a fiber-to-fiber switch. When the electrode pattern is placed at the junction of two fibers, the application of a voltage to it will generate a grating which deflects the light from the first fiber to the second.

The foregoing and other features of the present invention will be more readily apparent from the following detailed description and drawings.

DETAILED DESCRIPTION

Figure 1:
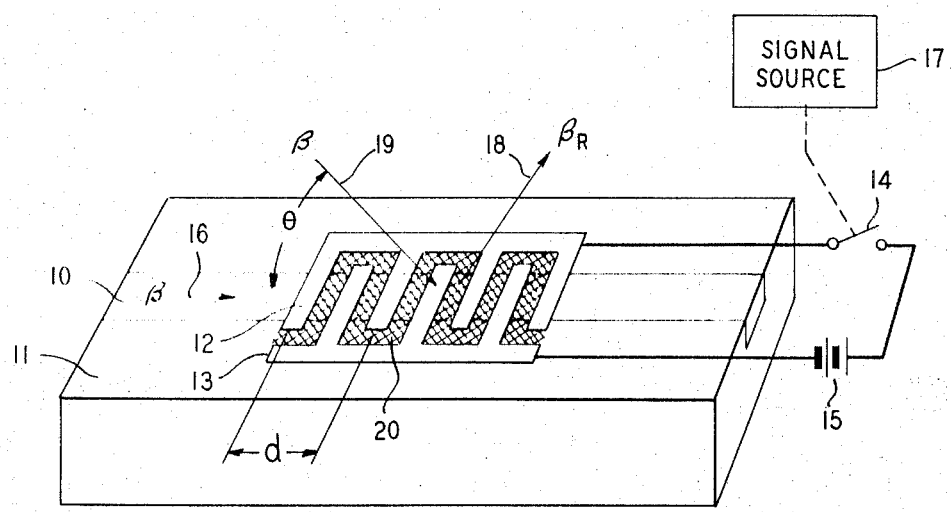
FIG. 1 is an illustrative embodiment of the invention.

In the drawings, FIG. 1 is a partially pictorial and partially schematic showing of an illustrative thin-film loss modulator embodiment of the invention. However, the proportions shown in FIG. 1 are not necessarily drawn to scale. The light guide consists of a transparent electro-optic guiding strip, 10, having an index of refraction $n_1$ and a substrate 11 having an index of refraction $n_2 < n_1$. In order to create a switch for the light guide, a portion of the guiding strip 10 is overlaid with an interdigital electrode structure comprised of electrodes 12 and 13, respectively. A switch 14 and a voltage source 15 are connected in series between electrodes 12 and 13. The guide strip 10 can be made of any conventional transparent electro-optic material, such as lithium niobate, $LiNbO_3$, or lithium tantalate, $LiTaO_3$, arranged so that its principal crystal axis is parallel to the desired propagation path of the light. The electrodes can be any type of transparent conducting film, such as tin oxide, $SnO_2$, which is deposited on the thin-film guide. Spaced between the fingers of electrodes 12 and 13 is a transparent dielectric material, 20, having the same index of refraction as the electrodes.

When switch 14 is closed it produces a voltage difference between the fingers of the electrodes, which results in a spatially varying change in the index of refraction in guide strip 10 in the direction of light propagation. This change in index of refraction acts as a diffraction grating for light propagating in the guide. When this light, indicated by arrow 16 in FIG. 1, reaches the induced diffraction grating it is diffracted out of the guide, as shown by arrow 18, and transmission through the remaining section of the light guide is prevented. When switch 14 is open, the diffraction grating disappears and light is free to continue traveling in the guide. The electrode pattern itself will not act as a diffraction grating when switch 14 is open because the spaces between the fingers of the electrode pattern have the same index of diffraction as the fingers themselves. If the index of refraction of the electrodes and the dielectric 20 are the same as the index of refraction of the surrounding media, the presence of the switch would not disturb the light traveling in the guide at all. With the arrangement of FIG. 1 the longitudinal component of the modulating E field modulates the index for either polarization of the light traveling in the guide. Therefore, either TE or TM modes of any order are modulated.

This same structure can also be used as a combination grating coupler and modulator. In this case, light is directed on to the switch at an angle $\theta$, as shown by arrow 19 in FIG. 1. The angle $\theta$ depends on the same factors which are important in a permanent grating and its value can be determined with the Equations given in U.S. Pat. No. 3,674,335 of A. Ashkin et al., which issued July 4, 1972. With this arrangement, the light incident on the grating is diffracted so that it can propagate in the guide strip 10. The electric field can be switched under the control of a signal source, 17, so as to modulate the amount of light introduced into the wave guide, thereby providing a combination grating coupler and modulator. A series of these switches located along the same light guide could form an optical frequency multiplexer.

The mechanical spacing of the electrodes can be determined by considering the induced diffraction grating as a propagating wave. In this case, the propagation constant $\beta_m$ for the mechanical spacing of the electrode pattern would be equal to $2\pi/d$, where $d$ is the finger spacing, as shown in FIG. 1. This propagation constant must be such that it converts the mode of the light traveling in the guide into one of the radiation modes for the grating; that is $$\beta_m = \beta - \beta_r$$

(1)

where $\beta$ equals the propagation constant of light traveling in the guide and $B_r$ equals the propagation constant of the diffracted light. Since the modulator will be effective regardless of the direction of the radiated light, $$-k_s < \beta_r < k_s$$

(2)

where $k_s$ equals the propagation constant of an infinite plane wave in an infinite medium of the electrode material. If the index of refraction of the electrodes are considered to be the same as the substrate 11, $k_s = n_2 k$. Therefore, Equation (2) can be rewritten as $$-n_2 k < \beta_r < n_2 k.$$

(3)

Substituting Equation (1) into Equation (3) and using the fact that, for well-guided modes, $\beta \cong n_1 k$ yields:

$$(n_1 - n_2)k < \beta_m < (n_1 + n_2)k.$$

(4)

Realizing that $\beta_m = 2\pi/d$ and $k = 2\pi/\lambda$, allows limits for the finger spacing, $d$, for the electrodes to be given as $$\lambda/n_1 + n_2 < d < \lambda/n_1 - n_2.$$

(5)

When $\lambda$ equals one micron and $n_1 - n_2$ equals .01 times the index of refraction for glass, $d$ is a few microns in distance. If the interaction region is made to be a few hundred to a few thousand wavelengths, a very efficient modulator is created.

The speed of a modulator of this type can be determined by calculating the capacitance associated with the electrode structure. Calculations for a typical light beam indicate that speeds in the gHz range are possible. Therefore, the thin-film loss modulator of FIG. 1 can be switched at high speeds if it is necessary to modulate a signal which is being coupled into the guide. However, when the modulator is being used in a continuous mode, it requires only the application of a dc voltage to achieve the modulating effect, as opposed to the high frequency driving circuits required by the prior art. Also, when the light traveling in the guide is multimode, the switch will still be able to effectively modulate it. The various modes will each be deflected out of the guide at different angles. This would be indicated in FIG. 1 by replacing arrow 18 with a group of arrows at different angles.

Figure 2:
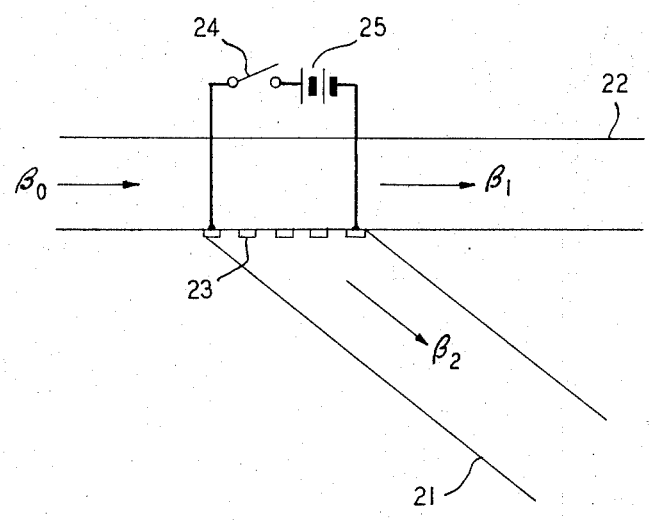
FIG. 2 is an illustrative embodiment of the invention in a fiber-to-fiber switch embodiment.

Another useful embodiment of the principles of the present invention is disclosed in FIG. 2. FIG. 2 is a schematic of a fiber-to-fiber switch; but the proportions are not necessarily drawn to scale. The fiber 22 in FIG. 2, which contains the propagating light $\beta_o$, has a branch fiber 21 attached to it. An electrode pattern 23, similar to electrodes 12 and 13 of FIG. 1, is located at the junction of fibers 21 and 22. A switch 24 and a voltage source 25 are connected in series with each other and are connected to the electrode structure 23 in the same manner that switch 14 and voltage source 15 are connected to electrodes 12 and 13 of FIG. 1. The closing of switch 24 will produce a varying electric field between the fingers of electrode 23, which produces a variation in the index of refraction in that area. This variation in the index of refraction forms a diffraction grating for the light $\beta_o$. If the fiber 21 is at the proper angle, the grating induced by the electric field will cause the light $\beta_o$ to be diffracted into fiber 21, as illustrated by arrow $\beta_2$. When the electric field is removed by opening switch 24, the diffraction grating is removed and the light $\beta_o$ continues along fiber 22, as indicated by arrow $\beta_1$. Since this type of structure is capable of high switching speeds, an arrangement of this sort can be used to time demultiplex a train of optical pulses in fiber 22. If the arrangement of FIG. 2 is modified so that the induced grating is small compared to the diameter of the beam traveling in fiber 22, the system can be used for power sampling or for coupling at low levels.

While the invention has been particularly shown and described with reference to two specific embodiments thereof, it will be understood by those skilled in the art that various changes in form and detail may be made therein without departing from the spirit and scope of the invention. For example, the transmission grating created by the arrangement in FIG. 1 could be replaced with an electrode structure which creates a reflection grating.

We claim:

1. An optical switch comprising:
   a first segment of electro-optic light guiding material having an index of refraction $n_1$;
   a body of material at least partly surrounding said first segment and having an index of refraction less than $n_1$;
   first and second transparent electrodes located on said first segment, said electrodes arranged in an interdigital pattern with a spacing $d$ and with digits substantially normal to the direction of light propagation in said segment, the index of refraction $n_2$ of said transparent electrodes being less than the index of refraction $n_1$ of said first segment;
   a transparent dielectric material covering said first and second electrodes, said dielectric material having the same index of refraction as said electrodes; and
   means for applying an electric potential between said electrodes so as to induce a spatial modulation of the refractive index of said first segment in the direction of light propagation in said first segment forming a diffraction grating that couples external propagating light modes with internal guided light modes.

2. An optical switch as claimed in claim 1 wherein said first segment consists of lithium niobate, $LiNbO_3$.

3. An optical switch as claimed in claim 1 wherein said first segment consists of lithium tantalate, $LiTaO_3$.

4. An optical switch as claimed in claim 1 wherein said electrodes consist of tin oxide, $SnO_2$.

5. An optical switch as claimed in claim 1 wherein the spacing $d$ of said electrodes is given by $\lambda/n_1+n_2 < d < \lambda/n_1-n_2$, where $\lambda$ is the wavelength of the guided light.

6. An optical switch as claimed in claim 1, the surrounding body comprising a transparent dielectric substrate for supporting said first segment and said electrodes, said dielectric substrate having an index of refraction less than the index of refraction of said first segment and surrounding it on three sides along its length, said electrodes being located on the remaining side of said first segment along its length and oriented perpendicular to the direction of propagation in said first segment, thereby modulating light traveling in said first segment in response to said means for applying an electrical potential.

7. An optical switch as claimed in claim 1 including means for directing a light beam onto the electrode pattern, the means for applying an electric potential comprising means for supplying a variable potential between the electrodes to modulate and couple said light beam into said first segment.

8. An optical switch as claimed in claim 1, further including a second segment of electro-optic light guiding material, said second segment intersecting said first segment, said electrodes being located across a portion of the width of said second segment and oriented so that the induced grating will cause light traveling in said first segment to be diffracted into said second segment.

9. An optical switch as claimed in claim 1 wherein the indices of refraction of said electrodes, said first segment and said second segment are equal.

* * * * *